United States Patent Office 3,377,243
Patented Apr. 9, 1968

3,377,243
ANTIBIOTIC RA–6950β AND METHOD OF PRODUCTION USING *STREPTOMYCES OCHROSPORUS*
Stanley Eugene De Voe and Lester Allen Mitscher, Pearl River, N.Y., assignors to American Cyanamid Company, Stamford, Conn., a corporation of Maine
Filed Oct. 22, 1964, Ser. No. 405,681
9 Claims. (Cl. 167—65)

ABSTRACT OF THE DISCLOSURE

The invention relates to a new antibiotic of unknown configuration produced by fermentation of *Streptomyces ochrosporus* n.s. The antibiotic designated RA–6950β, is separable into components identified as RA–6950$\beta_A$ and RA–6950$\beta_B$ which are active against gram-positive bacteria. The chemical, physical and biological properties of the antibiotic are described in detail hereinafter.

---

Figure 1:
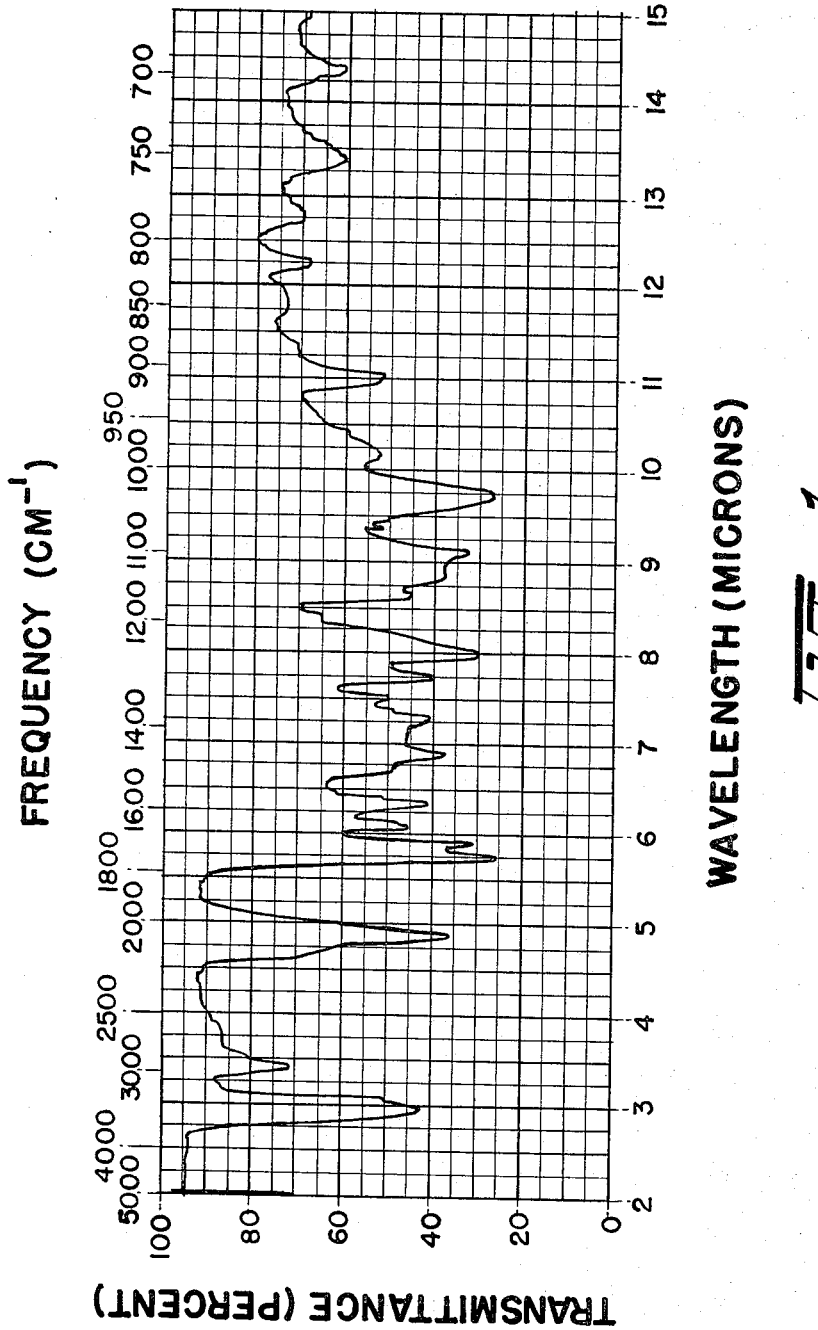

This invention relates to a new antibiotic, to its production by microbiological fermentation of a heretofore undescribed Streptomycete, *Streptomyces ochrosporus* n.s., to methods for its recovery and concentration from crude solutions, and to processes for its purification.

This invention includes within its scope the antibiotic in dilute forms, as crude concentrates, and in pure crystalline forms. These novel products are active against a wide variety of microorganisms including gram-positive bacteria. The effects of the new antibiotic on specific microorganisms together with its chemical and physical properties, differentiate it from previously described antibiotics.

The new antibiotic which we have designated RA–6950β is formed during cultivation under controlled conditions of *Streptomyces ochrosporus* n.s. The new species *Streptomyces ochrosporus* was isolated from a soil sample collected in Venezuela. A viable culture of the organism has been deposited with the Culture Collection Laboratory, Northern Utilization Research and Development Division, United States Department of Agriculture, Peoria, Ill., and has been added to its permanent collection as NRRL 3146.

The following is a general description of *Streptomyces ochrosporus* based on the diagnostic characteristics observed. The underscored descriptive colors are taken from the "Color Harmony Manual," Third Edition (1948).

Amount of growth.—Moderate to good on most media; light on Czapek's Solution and Inorganic Salts-Starch agars.

Aerial mycelium and/or en masse spore color.—Aerial mycelium white to yellowish with sporulation in yellowish shades from Parchment (1½ db) to Yellow Tint (1 ba) to Ivory (2 db). Sporulation light to moderate on several media. Very light to absent on Czapek's Solution, Bennett's, Hickey and Tresner's, Carvajal's, Inorganic Salts-Starch, and Oatflake Agars.

Soluble pigment.—Yellowish to yellowish-brown to brownish on most media and in light to moderate amounts.

Reverse color.—In yellowish to brownish shades on most media.

Miscellaneous physiological reactions.—Nitrates reduced to nitrites; moderate gelatin liquefaction; chromogenic on peptone-iron agar. Carbon source utilization according to Pridham et al. [J. Bact. 56: 107–114 (1948)] as follows: good to fair utilization of d-fructose, d-mannitol, d-trehalose, d-xylose, dextrose, dextran, lactose and salicin; poor to nonutilization of adonitol, 1-arabinose, i-inositol, d-melezitose, 1-rhamnose, d-melibiose and d-raffinose.

Morphology.—Spores in long flexuous chains, spores elliptical to elongate 0.3–0.4μ x 0.7–0.9μ; and smooth-walled as determined by electron microscopy.

*Streptomyces ochrosporus* is a member of the yellow-spored streptomycetes according to Tresner and Backus, ["System of Color Wheels for Streptomycete Taxonomy," Appl. Microbiol. 11:335–338 (1963)]. When following Pridham et al. ["A Guide for the Classification of Streptomycetes According to Selected Groups," Appl. Microbiol. 6–52–79, (1958)] the spore chains are of the rectusflexibilis (RF) type. When the new organism was compared, according to these as well as other pertinent taxonomic features, with known species having similar characteristics, it was found to stand out as a new species. In keeping with good nomenclatural practices, the binomial epithet *Streptomyces ochrosphorus* n.s. has been chosen for it to be descriptive of its yellowish sporulation.

A critical examination of the cultural, physiological and morphological features of the organism was made when it was grown on several media, including those recommended by Pridham et al. ["A Selection of Media for Maintenance and Taxonomic Study of Streptomyces," Antibiotics Annual (1956–1957), pp. 947–953]. Detailed observations are recorded in Tables I, II, III, and IV below. Underscored descriptive colors are taken from the "Color Harmony Manual."

TABLE I.—CULTURAL CHARACTERISTICS OF *STREPTOMYCES OCHROSPORUS* NRRL 1346
[Incubation, 14 days. Temperature, 28° C.]

| Medium | Amount of Growth | Aerial Mycelium and/or Spores | Soluble Pigment | Reverse Color | Remarks |
|---|---|---|---|---|---|
| Czapek's Solution Agar. | Light | Aerial mycelium thin, white. Sporulation very light. | None | Whitish | |
| Tomato Paste Agar | Moderate | Aerial mycelium white to yellowish, becoming Parchment (1½ db) in sporulating areas. Sporulation moderate. | Yellowish; light | Honey Gold (2 ic). | Sectoring. |
| Bennett's Agar | do | Aerial mycelium whitish; very thin, becoming yellowish in sporulation zones. Sporulation very light. | do | Cinnamon (3 le). | Central zones forked and wrinkled. |
| Asparagine Dextrose Agar. | do | Aerial mycelium yellowish white, becoming Yellow Tint (1 ba) in sporulation zones. Sporulation light. | None | Lt. Brown (4 ng). | Sectoring. |
| Hickey and Tresner's Agar. | do | Aerial mycelium whitish. Traces of yellowish sporulation in marginal areas. | Yellowish-brown; light. | Cinnamon (3 le) | Central zones folded and wrinkled. |
| Carvajal's Oatmeal Agar. | Good | Aerial mycelium very sparse, whitish. Trace of yellowish sporulation in marginal areas. | Brownish; moderate. | Deep brown (5 pl) | Surface folded and wrinkled. |
| Potato Dextrose Agar | Moderate | Aerial mycelium yellowish white becoming Parchment (1½ db) in sporulation zones. Sporulation moderate. | Yellowish-brown; moderate. | do | Sectoring. |
| Tomato Paste Oatmeal Agar. | do | Aerial mycelium yellowish white, becoming Ivory (2 db) in sporulation zones. Sporulation moderate. | do | Lt. Brown (4 ng) | |
| Yeast Extract Agar | do | Aerial mycelium whitish, becoming Ivory (2 db) in sporulation zones. Sporulation moderate. | do | Dk. Luggage Tan (4 pg). | Sectoring. |
| Inorganic Salts-Starch Agar. | Light | Aerial mycelium very sparse, whitish. No sporulation. | None | Clove Brown (3 ni). | |
| Oat Flake Agar | Good | Aerial mycelium sparse, whitish. No sporulation. | Brownish; moderate. | Deep Brown (5 pl) | |

TABLE II.—MICROMORPHOLOGY OF STREPTOMYCES OCHROSPORUS N.S. NRRL 3146

| Medium | Aerial Mycelium and/or Sporiferous Structures | Spore Shape | Spore Size | Spore Surface |
|---|---|---|---|---|
| Asparagine Dextrose Agar. | Spores borne in long flexuous chains. | Spores elliptical to elongate. | 0.3–0.4 µ x 0.7–0.9 µ | Spore surfaces smooth as determined by electron microscopy. |

TABLE III.—MISCELLANEOUS PHYSIOLOGICAL REACTION OF STREPTOMYCES OCHROSPORUS NRRL 3146
[Temperature, 28° C.]

| Medium | Incubation Period | Amount of Growth | Physiological Reaction |
|---|---|---|---|
| Organic Nitrate Broth | 7 Days | Heavy | Nitrates reduced to nitrates. |
| Do | 14 Days | do | Do. |
| Gelatin | 7 Days | Light | Slight liquefaction. |
| Do | 14 Days | Moderate | Moderate liquefaction. |
| Peptone-Iron Agar | 24 Hours | do | Chromogenic. |

It is to be understood that for the production of the new antibiotic the present invention is not limited to this particular organism or to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure and the like.

The fermentation process

Cultivation of the organism *S. ochrosporus* may be carried out in a wide variety of liquid culture media. Media which are useful for the production of the novel antibiotic include an assimilable source of carbon such as starch, sugar, molasses, glycerol, etc.; an assimilable source of nitrogen such as protein, protein hydrolysate, polypeptides, amino acids, corn steep liquir, etc.; and inorganic anions and cations, such as potassium, sodium, calcium, sulfate, phosphate, chloride, etc. Trace elements such as boron, molybdenum, copper, etc. are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1% octadecanol in lard oil may be added as needed.

Shaker flask inocula

Shaker flask fermentaions of *S. ochrosporus* ordinarily are carried out by inoculating 100 milliliters of sterile liquid medium in 500 milliliters flasks with washings from an agar slant of the culture. The following medium may be used.

| | |
|---|---|
| Molasses | grams__ 20 |
| Glucose | do____ 10 |
| Bactopeptone | do____ 5 |
| Water to | milliliters__ 1000 |

The flasks are incubated at a temperature from 25–29° C., preferably 28° C. and agitated vigorously on a reciprocating shaker for 48 to 72 hours, usually for 72 hours. These 100 milliliter inocula are used to inoculate one liter batches of the same medium in 5 gallon bottles. After appropriate incubation these batches of inocula are used to inoculate fermentor tanks.

Small tank fermentation

For the production of the antibiotic in tank fermentors the following fermentation medium may be used.

| | |
|---|---|
| Soybeam meal | grams__ 10 |
| Glucose | do____ 10 |
| Sodium chloride | do____ 5 |
| Prograsol | do____ 5 |
| Calcium carbonate | gram__ 1 |
| Water to | milliliters__ 1000 |

Each tank is inoculated with approximately 3% of inocula made as described above. Aeration is supplied at the rate of 0.7 liter of sterile air per liter of broth per minute and the fermenting mixture is agitated by an impeller driven at 750–850 r.p.m. The temperature is maintained at 25–29° C., usually at 28° C. The fermentation is ordinarily continued for 48 hours or so, after which this inoculum is used to inoculate a large fermentor tank.

Large tank fermentation

The same fermentation medium as above is used. Each tank is inoculated with approximately 3% of inoculum as obtained from the small tank fermentation. Aeration is supplied at the rate of 0.75 liter of sterile air per liter of broth per minute. The mixture is agitated by an impeller driven at about 100 r.p.m. The temperature is maintained as above and the fermentation is carried out for from 20–30 hours at which time the mash is harvested. With some cultures it is found that the harvesting time has to be closely controlled, e.g. 24–36 hours because if the fermentation is allowed to proceed for longer periods, the yield is decreased.

Purification procedure

After the fermentation is completed, the fermented mash containing the antibiotic of this invention is filtered preferably at about pH 7.0, to remove the mycelium. Diatomaceous earth or any other conventional filtration aid may be used to assist the filtration. Normally the mycelial cake is washed with water and the wash is pooled with the filtrate. Thereafter, the antibiotic may be recovered using conventional techniques.

The antibiotic may be extracted from the filtrate with a water immiscible solvent such as ethyl acetate at about pH 7.0. The extract is ordinarily concentrated in vacuo to approximately one percent of the original volume. The concentrate is filtered slowly into a suitable quantity of petroleum ether to yield a gummy precipitate which, on evaporation of the solvent, yields the components $\beta_A$ and $\beta_B$ in crude form.

Separation and purification of the two components may be effected by partition column chromatography. The residual solid containing crude $\beta_A$ and $\beta_B$ is dissolved in a minimal amount of the lower phase of a solvent system consisting of cyclohexane, dioxane and water in the volume ratios of 2:3:2, respectively, and charged to a column composed of diatomaceous earth wet with half its weight of the lower phase of the same solvent system. The column is then developed with the upper phase to elute the desired $\beta_A$ and $\beta_B$ antibiotic activity, collecting the eluate between 1.0 and 3.0 holdback volumes ($\beta_A$) and 3.8 to 7.6 holdback volumes ($\beta_B$) in separate containers. The individual eluates are then concentrated in vacuo and the resultant residues are dissolved separately in minimal volumes of diethyl ether. Component $\beta_A$ is crystallized from this solution on standing at room temperature for several hours and is then collected by filtration. Component β_B may be precipitated by adding the diethyl ether solution to a quantity of petroleum ether (30–75° C.). β_B may be further purified by passing it through and acid washed diatomaceous earth column wet with half its weight of the lower phase of a solvent system consisting of ethyl acetate, petroleum ether, acetone and water in the volume ratios of 0.05:3:2:1, respectively. The column is developed using the upper phase of the same system, collecting the eluate from 14.0 to 20.0 holdback volumes. This fraction is concentrated in vacuo and the resultant residue is dissolved in diethyl ether from which pure β_B component may be crystallized. Pure β_B component is closely related to the β_A component but differs in several characteristics.

The novel antibiotic of this invention contains the elements carbon, hydrogen, oxygen, nitrogen and sulfur in substantially the following percentages by weight:

|  | β_A Component | β_B Component |
|---|---|---|
| Carbon | 49.76 | 49.36 |
| Hydrogen | 5.38 | 5.73 |
| Oxygen | 35.44 | 34.74 |
| Nitrogen | 3.80 | 3.73 |
| Sulfur | 4.52 | 4.44 |

The following are various physical characteristics of the β_A component:

Calculated molecular weight _____ 687–715
Melting point ° C. _____ 122–124

The percent of methyl groups attached to an oxygen is 2.42 (as $CH_3$) and the percent of methyl groups attached to a carbon is 6.86 (as $CH_3$). There are no methyl groups attached to a nitrogen atom. The percent acetyl groups attached to an oxygen is 11.20. Optical rotation is $[\alpha]_D^{25°} = -58°$ ($\pm 3°$) (C.—0.985 in methanol), Ultraviolet maxima occur at:

236 mμ ($E_{1\,cm.}^{1\%} = 210$)

277 mμ ($E_{1\,cm.}^{1\%} = 135$)

322 mμ ($E_{1\,cm.}^{1\%} = 130$) in ethanol

In infrared absorption spectrum of the β_A component in a KBr pellet is prepared in a standard manner. It exhibits characteristic absorption in the infrared region of the spectrum at the following wavelengths expressed in microns: 3.00, 3.07, 3.45, 4.92, 5.75, 5.90, 6.10, 6.15, 6.34, 6.75, 6.90, 7.30, 7.40, 7.52, 7.75, 8.00, 8.65, 8.90, 9.10, 9.75, 10.20, 11.00, 11.80, 12.25, 12.80, 13.40, 14.40. The infrared curve is shown in FIGURE 1 of the accompanying drawings.

Listed below are selected physical characteristics of component β_B. The percent of methyl groups attached to an oxygen is 2.42 (as $CH_3$) and the percent of methyl groups attached to a carbon is 7.03 (as $CH_3$). The percent acetyl groups attached to an oxygen is 11.46.

The melting point of RA–6950β_B is not sharp. It softens at 125° C. and appears to decompose at about 145° C. Optical rotation is $[\alpha]_D^{25°} = -60°$ ($\pm 3°$ C.=0.919 in methanol). Ultraviolet maxima occur at:

204 mμ ($E_{1\,cm.}^{1\%} = 323$)

236 mμ ($E_{1\,cm.}^{1\%} = 235$)

277 mμ ($E_{1\,cm.}^{1\%} = 160$)

320 mμ ($E_{1\,cm.}^{1\%} = 145$) in ethanol

Figure 3:
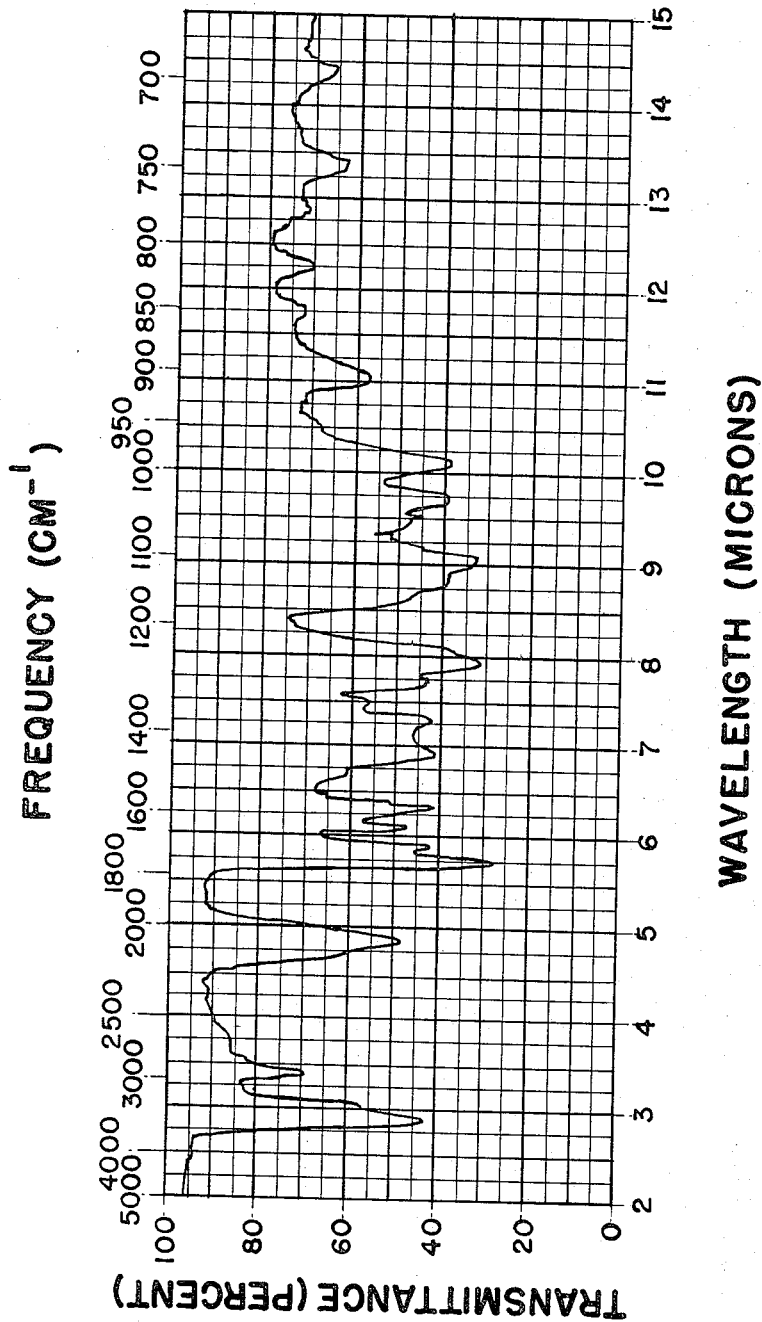

An infrared absorption spectrum of component β_B in a KBr pellet is prepared in a standard manner. It exhibits characteristic absorption in the infrared region of the spectrum at the following wavelengths expressed in microns: 2.95, 3.42, 4.88, 5.75, 5.90, 6.15, 6.33, 6.70, 6.90, 7.30, 7.50, 7.75, 7.95, 8.85, 9.05, 9.50, 9.70, 10.15, 11.00, 11.75, 12.25, 12.90, 13.35, 14.40. The infrared curve of RA–6950β_B is shown in FIGURE 3 of the accompanying drawings.

RA–6950β shows the following Rf values in the solvent systems indicated below using *Bacillus subtilis* pH 6.0 as the detection organism:

Rf value: 0.20.

Solvent system:

| | Parts |
|---|---|
| n-Heptane | 200 |
| Tetrahydrofuran | 50 |
| n-Amyl acetate | 50 |
| 0.2 M acetic acid | 200 |

Rf value: 0.89.

Solvent system:

| | Parts |
|---|---|
| n-Amyl acetate | 100 |
| Dibutyl ether | 30 |
| Acetic acid | 5 |
| Water | 100 |

The solubility of the RA–6950β complex increases generally with increasing polarity of the solvent. The antibiotics are insoluble in hexane and water; moderately soluble in ethers, such as diethyl, diisopropyl, and the like; and are freely soluble in most common organic solvents such as methanol, acetone, dimethylsulfoxide, chloroform, methylene chloride, dimethylformamide, glacial acetic acid, benzene, ethyl acetate, and the like. The components of the RA–6950β complex reduce tetrazolium salts, decolorize aqueous permanganate and liberate nitrogen from the sodium azide-iodine reagent.

Figure 2:
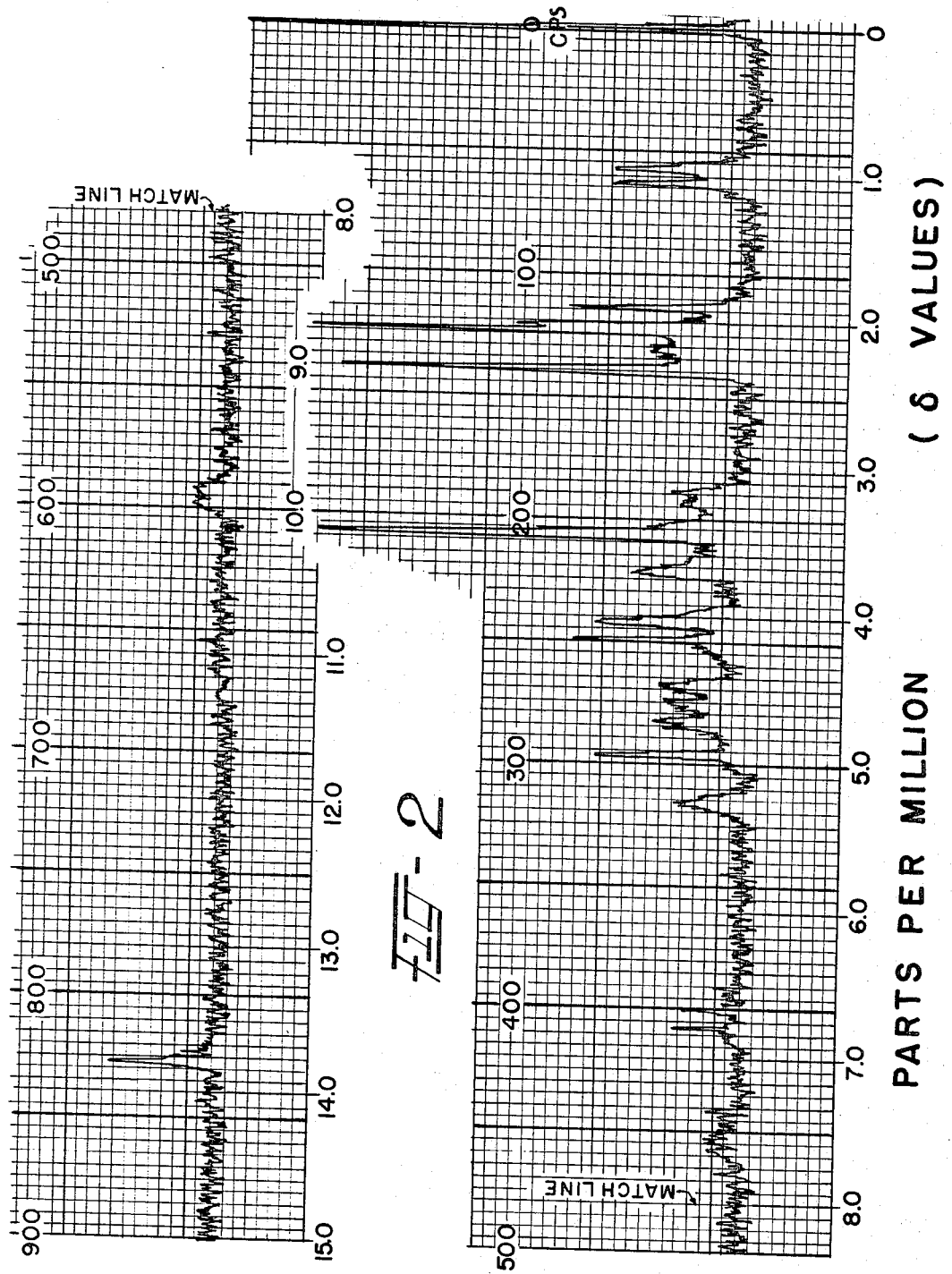

The proton magnetic resonance spectra of the antibiotics of this invention are prepared using a Varian A–60 spectrometer at 60 megacycles in the customary manner by dissolving in deuterochloroform containing tetramethylsilane as an internal standard. The compound β_A presents a characteristic complex absorption pattern with principal features occurring at the following frequencies expressed in c.p.s. (cycles per second) units: 829, 595, 455, 406, 400, 316, 295, 282, 275, 268, 250, 243, 224, 208, 195, 190, 140, 121, 114, 64, 56. The resonance spectrum of RA–6950β_A is shown in FIGURE 2 of the accompanying drawings.

Figure 4:
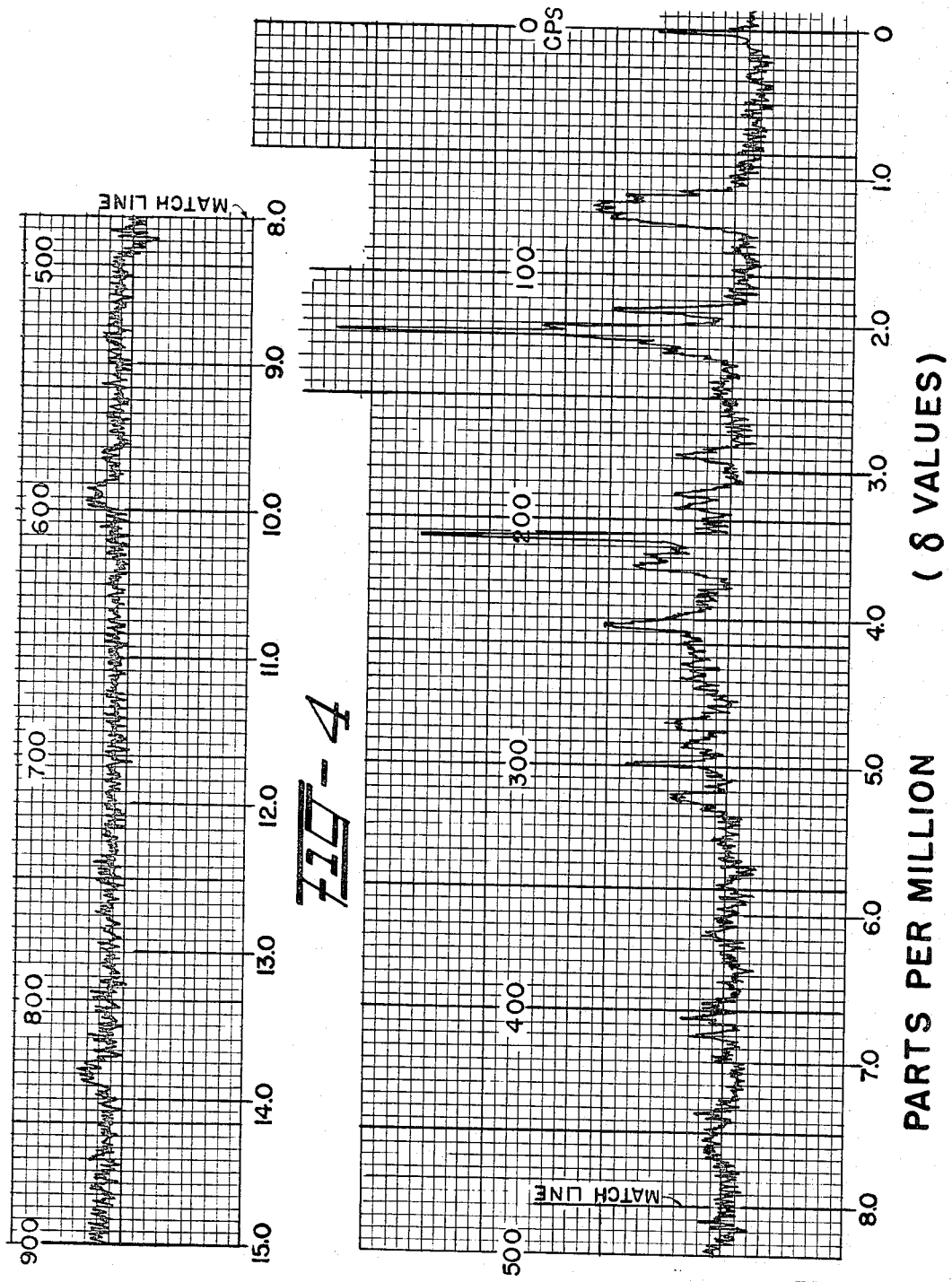

Components β_B presents a characteristic complex absorption pattern with principal features occurring at the following frequencies expressed in c.p.s. (cycles per second) units: 830, 595, 480, 450, 410, 402, 313, 300, 290, 280, 265, 242, 220, 207, 195, 190, 175, 125, 115, 75. The resonance spectrum of RA–6950β_B is shown in FIGURE 4 of the accompanying drawings.

Both components β_A and β_B are clearly distinguished from other antibiotics by the characterization data given above and by their antimicrobial activity. The in vitro antimicrobial activity of these two components is presented in the tables below which show the minimal inhibitory concentration required to inhibit the growth of representative microorganisms in a nutrient medium.

TABLE V

| | Minimal Inhibitory Concentrations (micrograms per ml.) | |
|---|---|---|
| | RA–6950β_A, pH 6.0 | RA–6950β_B, pH 6.0 |
| *Mycobacterium smegmatis.* ATCC 607 | 0.2 | 6.2 |
| *Staphylococcus aureus*, ATCC 6538P | 0.4 | 0.8 |
| *Streptococcus faecalis*, ATCC 8043 | 0.4 | 0.8 |
| *Escherichia coli*, ATCC 9637 | 50 | 100 |
| *Proteus vulgaris*, ATCC 9484 | 3.1 | 12.5 |
| *Pseudomonas aeruginosa.* ATCC 10145 | 50 | 100 |
| *Salmonella gallinarum*, Led. An. Ind. 604 | 50 | 50 |

TABLE VI

| | RA-6950$\beta_A$, pH 6.0 | RA-6950$\beta_A$, pH 7.9 | RA-6950$\beta_B$, pH 6.0 | RA-6950$\beta_B$, pH 7.9 |
|---|---|---|---|---|
| Streptococcus faecalis, ATCC 8043 | 0.39 | 25 | 0.78 | >25 |
| Streptococcus sp., nonhemolytic No. 11 | 0.39 | 12.5 | 0.78 | 25 |
| Streptococcus sp., β hemolytic, No. 80 | 0.39 | 12.5 | 0.78 | 12.5 |
| Streptococcus pyogenes, Kirby isolate No. 154 | | 0.78 | | 0.78 |
| Streptococcus pyogenes, Kirby isolate No. 158 | | >25 | | 25 |
| Streptococcus pyogenes, NY-5 | | 6.2 | | 3.1 |
| Sacrina lutea, ATCC 9341 | | 3.1 | | 6.2 |
| Staphylococcus aureus, 4050B122-3 | 0.2 | 6.2 | 0.39 | 12.5 |
| Staphylococcus aureus, 4050B122 7 | 0.2 | 6.2 | 1.56 | 12.5 |
| Staphylococcus aureus, 4050B122-9 | 0.2 | 6.2 | 0.39 | 12.5 |
| Staphylococcus aureus, 4050B122-10 | 0.2 | 12.5 | 0.39 | >25 |
| Staphylococcus aureus, 4050B122-11 | 0.2 | 12.5 | 0.39 | >25 |
| Staphylococcus aureus, 4050B122-13 | 0.39 | 6.2 | 1.56 | 25 |
| Staphylococcus aureus, 4050B122-14 | 0.2 | 6.2 | 0.39 | 25 |
| Staphylococcus aureus, Rose, ATCC 14154 | 0.2 | 6.2 | 0.39 | 25 |
| Staphylococcus aureus, Smith, ATCC 13709 | 0.2 | 3.1 | 0.39 | 6.2 |
| Staphylococcus aureus, No. 69 | 0.2 | 3.1 | 0.39 | 6.2 |

Components $\beta_A$ and $\beta_B$ are active against a variety of gram-positive microorganisms, such as staphylococci and streptococci. The new antibiotics are thus potentially useful as therapeutic agents in treating bacterial infections in animals caused by such microorganisms. The new antibiotics can be expected to be usefully employed for controlling such infections by topical application or parenteral administration.

The usefulness of these antibiotics is demonstrated by their ability to control systemic lethal infections in mice. RA-6950$\beta_A$ shows high in vivo antibacterial activity in mice against Staphylococcus aureus, strain Smith, Staphylococcus aureus, strain Rose, and Streptococcus pyogenes, C-203, when administered by a single dose to groups of Carworth Farms CF-1 female mice, weight about 20 grams infected intraperitoneally with a lethal dose of these bacteria in $10^{-2}$, $10^{-3}$ and $10^{-5}$ trypticase soy broth (TSP) dilutions, respectively, of a five-hour TSP blood culture.

Table VII below illustrated the in vivo anti-bacterial activity of components RA-6950$\beta_A$ and RA-6950$\beta_B$.

TABLE VII

In Vivo Antibacterial Activity of RA-6950$\beta_A$

| Test system | Dosage, mg./kg. of body wt. | Survivors Total S.O.D.[1] | Survivors Total S.S.C.[2] |
|---|---|---|---|
| Staphylococcus aureus, Strain Smith | 640 | 20/20 | |
| | 320 | 14/20 | |
| | 160 | 9/20 | |
| | 80 | 0/10 | 18/20 |
| | 40 | | 26/30 |
| | 20 | | 25/30 |
| | 10 | | 16/30 |
| | 5 | | 16/30 |
| | 2.5 | | 5/30 |
| | 1.25 | | 0/10 |
| Staphylococcus aureus, strain Rose | 80 | | 7/10 |
| | 40 | | 9/10 |
| | 20 | | 9/10 |
| | 10 | | 2/10 |
| Streptococcus pyogenes, C-203 | 80 | | 8/10 |
| | 40 | | 7/10 |
| | 20 | | 1/10 |

In Vivo Antibacterial Activity of RA-6950$\beta_B$

| Test system | Dosage | S.O.D. | S.S.C. |
|---|---|---|---|
| Staphylococcus aureus, strain Smith | 80 | (3) | 10/10 |
| | 40 | | 3/10 |
| | 20 | | 1/10 |
| | 10 | | 1/10 |

[1] S.O.D.=Single Oral Dose.
[2] S.S.C.=Single Subcutaneous Dose.
[3] Inactive.

All of the infected non-treated controls died within one day.

The invention will be described in greater detail in conjunction with the following specific examples.

Example 1.—Inoculum preparation

A typical medium used in the microbiological fermentation of this invention is as follows:

Molasses _____ grams__ 20
Glucose _____ do____ 10
Bactopeptone _____ do____ 5
Water to _____ milliliters__ 1000

The washings from an agar slant of S. ochrosporus are used to inoculate 100 milliliters of the above medium in a 500 ml. flask. The flask is placed on a reciprocating shaker and agitated vigorously for 72 hours, at 28° C. The resulting flask inoculum is transferred to a 5 gallon glass fermentor containing 1 liter of sterile medium. The glass fermentor is aerated with sterile air while growth is carried out for about 48 hours after which the contents are used to seed the fermentor tank.

Example 2.—Fermentation

A fermentation medium is prepared according to the following formula:

Soybean meal _____ grams__ 10
Glucose _____ do____ 10
Sodium chloride _____ do____ 5
Prograsol _____ do____ 5
Calcium carbonate _____ gram____ 1
Water to _____ milliliters____ 1000

The fermentation medium is sterilized at 120° C. with steam at 15 pounds pressure for 45-60 minutes. The pH of the medium before and after sterilization is between 7.0 and 7.5. Thirty liters of sterile medium in a 40 liter tank fermentor is inoculated with 1 liter of inoculum such as described in Example 1 and the fermentation is carried out at 28° C. for 48 hours. Aeration is supplied at the rate of 0.7 liter of sterile air per liter of medium per minute. The medium is agitated by an impeller driven at about 800 revolutions per minute. At the end of this period the 30 liter fermentation mash is used to seed 1000 liters of the above medium in a 1500 liter tank fermentor. Fermentation is continued at 28° C. for 25 hours. The medium is agitated by an impeller driven at 100 revolutions per minute and aeration is supplied at the rate of 0.75 liter of sterile air per liter of broth per minute. At the end of the fermentation period the mash is harvested.

Example 3.—Isolation

One thousand liters of fermented mash is adjusted to pH 7.0 and about 2% weight/volume of diatomaceous earth is added. The mixture is then filtered and the filter cake is washed with 100 liters of water. The pad is then discarded. The water wash and filtrate are pooled and the resultant solution is extracted with ethyl acetate (500 ml. ethyl acetate per 1000 ml. of filtrate) using a counter-current apparatus (ethyl acetate, 3 gallons/minute; filtrate, 6 gallons/minute). The ethyl acetate extract is concentrated to 500 ml. and the concentrate is filtered slowly through filter paper into about 3000 ml. of petroleum ether (30-75° C.) with stirring. The solvent is evaporated in vacuo to yield a gummy solid material containing the antibiotics activity (approximately 100 grams of solid).

A workable portion of the residual solid, about 10 grams, is dissolved in a minimal amount of acetone to which about 50 grams of diatomaceous earth is then added. The diatomaceous earth charge is desolventized of acetone, moistened with the lower phase of a solvent system consisting of cyclohexane, dioxane and water in the volume ratios of 2:3:2, respectively, and charged to a column composed of 1000 grams of diatomaceous earth wet with half its weight of the lower phase of the same solvent system. The column is then developed with the upper phase to elute the desired antibiotic activity, collecting the eluate from 1.0 to 3.0 holdback volumes and 3.8 to 7.6 holdback volumes in separate containers. The individual eluates are then concentrated in vacuo and the resultant residues are dissolved in minimal amounts of diethyl ether. The $\beta_A$ component crystallizes from this solution on standing at room temperature for several hours. The $\beta_B$ component may be precipitated by adding the diethyl ether solution to petroleum ether. Further purification of $\beta_B$ may be effected by column chromatography. The yield of $\beta_A$ is 2.5 grams and the yield $\beta_B$ is 1.5 grams. The chemical analysis of this product and its other chemical, physical and biological properties have already been described.

Example 4.—Purification of $\beta_B$

Two grams of $\beta_B$ component prepared according to Example 3 is charged to a column as described in Example 3 containing 200 grams of acid washed diatomaceous earth, wet with half its weight of the lower phase of a solvent system consisting of ethyl acetate, petroleum ether, acetone and water in the volume ratios of 0.05:3:2:1 respectively. The column is developed using the upper phase of the same system, collecting the eluate from 14.0 to 20.0 holdback volumes. This fraction of eluate is concentrated in vacuo and the resultant residue is dissolved in a minimal amount of diethyl ether and the solution is allowed to remain at room temperature for several hours until pure $\beta_B$ is precipitated. The crystals are collected by filtration and washed with diethyl ether. The yield of $\beta_B$ is 1.4 grams. The chemical analysis of this product and its other chemical, physical, and biological properties have already been described.

We claim:

1. A substance antibiotic RA6950$\beta_A$ characterized as follows:

Melting point: 122–124° C.

| Analysis: | Percent |
|---|---|
| Carbon | 49.76 |
| Hydrogen | 5.38 |
| Oxygen | 35.44 |
| Nitrogen | 3.80 |
| Sulfur | 4.52 |

Optical rotation: $[\alpha]_D^{25}$ °C.—58° (±3°) (C.=0.985 in methanol).
Ultraviolet maxima:

236 m$\mu$ ($E_{1\,cm.}^{1\%}$=210), 277 m$\mu$ ($E_{1\,cm.}^{1\%}$=135), 322 m$\mu$ ($E_{1\,cm.}^{1\%}$=130) in ethanol Infrared Spectrum: as shown in FIGURE 1
Proton Resonance Spectrum: as shown in FIGURE 2.

2. A composition of matter consisting of the substance according to claim 1 in the crystalline state.

3. A substance antibiotic RA–6950$\beta_B$ characterized as follows:

| Analysis: | Percent |
|---|---|
| Carbon | 49.36 |
| Hydrogen | 5.73 |
| Oxygen | 34.74 |
| Nitrogen | 3.73 |
| Sulfur | 4.44 |

Optical rotation: $[\alpha]_D^{25°}$=—60° (±3°) (C.=0.919 in methanol)
Ultraviolet maxima:

204 m$\mu$ ($E_{1\,cm.}^{1\%}$=323)

236 m$\mu$ ($E_{1\,cm.}^{1\%}$235)

277 m$\mu$ ($E_{1\,cm.}^{1\%}$=160)

320 m$\mu$ ($E_{1\,cm.}^{1\%}$=145) in ethanol

Infared spectrum: as shown in FIGURE 3
Proton resonance spectrum: as shown in FIGURE 4.

4. A composition of matter consisting of the substance according to claim 3 in the crystalline state.

5. A compound selected from the group consisting of antibiotic RA–6950$\beta_A$ as characterized in claim 1 and an antibiotic RA–6950$\beta_B$ as characterized in claim 3.

6. A composition containing as an essential antibacterial agent a compound as characterized in claim 5, and a pharmaceutical carrier.

7. A process which comprises cultivating *Streptomyces ochrosporus* NRRL 3146 in an aqueous nutrient medium containing assimilable sources of carbohydrate, nitrogen and inorganic salts under submerged aerobic conditions until substantial antibiotic activity is imparted to said medium by the production of a compound as characterized in claim 5.

8. A process which comprises cultivating *Streptomyces ochrosporus* NRRL 3146 in an aqueous nutrient medium containing assimilable sources of carbohydrate, nitrogen and inorganic salts under submerged aerobic conditions for a period of from 24 to 36 hours, and at a temperature of from 20 to 35° C. until substantial antibiotic activity is imparted to said medium by the production of a compound as characterized in claim 5, and then recovering the antibiotic activity therefrom.

9. A process as in claim 8 wherein the compound characterized in claim 5 is separated into components RA–6950$\beta_A$ and RA–6950$\beta_B$ by partition column chromatography.

References Cited

UNITED STATES PATENTS 3,147,184  9/1964  Gaeumann et al. _____ 167—65

ALBERT T. MEYERS, *Primary Examiner.*

D. M. STEPHENS, *Assistant Examiner.*

UNITED STATES PATENT OFFICE
CERTIFICATE OF CORRECTION

Patent No. 3,377,243                                          April 9, 1968

Stanley Eugene De Voe et al.

It is hereby certified that error appears in the above numbered patent requiring correction and that the said Letters Patent should read as corrected below.

Columns 3 and 4, after "TABLE III, about line 18, insert

TABLE IV
Carbon Source Utilization Pattern of Streptomyces ochrosporus NRRL 3146

Incubation - 10 Days
Temperature - 28° C.

| Carbon Source | Utilization* |
|---|---|
| Adonital | 1 |
| l-Arabinose | 1 |
| Dextran | 2 |
| d-Fructose | 3 |
| i-Inositol | 1 |
| Lactose | 2 |
| d-Mannitol | 3 |
| d-Melezitose | 1 |
| d-Melibiose | 0 |
| d-Raffinose | 0 |
| l-Rhamnose | 1 |
| Salicin | 2 |
| Sucrose | 0 |
| d-Trehalose | 3 |
| d-Xylose | 3 |
| Dextrose | 3 |
| Negative Control | 0 |

*
  3=Good Utilization
  2=Fair Utilization
  1=Poor Utilization
  0=No Utilization Signed and sealed this 11th day of November 1969.

(SEAL)
Attest:

EDWARD M. FLETCHER, JR.                               WILLIAM E. SCHUYLER, JR.
Attesting Officer                                                    Commissioner of Patents